United States Patent [19]

Frouin et al.

[11] Patent Number: 5,431,728
[45] Date of Patent: Jul. 11, 1995

[54] INORGANIC INJECTABLE SLURRIES AND CONSOLIDATION OF GROUND FORMATIONS/CONSTRUCTION MATERIALS THEREWITH

[75] Inventors: Laurent Frouin, L'Hay Les Roses; Maryse Pennavaire, Romainville, both of France

[73] Assignee: Rhone-Poulenc Chimie, Courbevoie Cedex, France

[21] Appl. No.: 150,887

[22] Filed: Nov. 12, 1993

[30] Foreign Application Priority Data

Nov. 12, 1992 [FR] France ............... 92 13603

[51] Int. Cl.⁶ ............................................. C04B 12/04
[52] U.S. Cl. ........................... 106/612; 106/600; 106/633; 106/636; 106/900; 405/263
[58] Field of Search ............... 106/600, 633, 612, 636, 106/900; 166/261, 285; 252/8.551; 405/266, 267, 269, 263

[56] References Cited

U.S. PATENT DOCUMENTS

| 4,056,937 | 11/1977 | Suzuki | 106/632 |
| 4,761,183 | 8/1988 | Clarke | 106/624 |
| 5,017,233 | 5/1991 | Gouvenot | 106/600 |

FOREIGN PATENT DOCUMENTS 2528441 12/1983 France .
635064 11/1978 U.S.S.R. .

OTHER PUBLICATIONS

Patent Abstracts of Japan, vol. 016, No. 455 (C-987) 22 Sep. 1992 & JP-A-41 59 389 (Kyokado Eng. Co.) 2 Jun. 1992.
Chemical Abstracts, vol. 98, No. 6, 7 Feb. 1983, Columbus, Ohio, US; abstract No. 39779j, & SU-A-945 130 (Leningrad Technological Institute) 23 Jul. 1982.
Database WPIL, Week 9248, Derwent Publications Ltd., London, GB; AN 92-397132 & SE-A-1 707 138 (Yakutya Diamond Mining Ind. Inst.) 23 Jan. 1992.
Patent Abstract of Japan, vol. 005, No. 156 (C-074) 6 Oct. 1981 & JP-A-56 086 984 (Nitto Chem Ind. Co. Ltd.) 15 Jul. 1981.
Chemical Abstracts, vol. 115, No. 24, 16 Dec. 1991, Columbus, Ohio, US; abstract No. 262085v, & Datanase WPIL Week 9136, Derwent Publiations Ltd., London, GB; AN 91-262365 & JP-A-03 170 596 (Kyokado Engineering Co.), 24 Jul. 1991.
Chemical Abstracts, vol. 104, No. 4, 27 Jan. 1986, Columbus, Ohio, US; abstract No. 23478s & JP-A-60 124 687 (Light Kogyo K.K.) 3 Jul. 1985.

*Primary Examiner*—Mark L. Bell
*Assistant Examiner*—Michael Marcheschi
*Attorney, Agent, or Firm*—Burns, Doane, Swecker & Mathis

[57] ABSTRACT

Inorganic settable slurries well suited for the sealing and/or consolidation of unstable soil/ground formations, or for the sealing/repair of defective building materials, include (a) an aqueous solution of an alkali metal silicate, (b) a water-soluble calcium compound, e.g., lime, (c) an alkali metal aluminate, and (d) an alkali metal hydroxide, preferably sodium hydroxide.

25 Claims, No Drawings

INORGANIC INJECTABLE SLURRIES AND CONSOLIDATION OF GROUND FORMATIONS/CONSTRUCTION MATERIALS THEREWITH

BACKGROUND OF THE INVENTION

Field of the Invention:

The present invention relates to essentially, typically completely inorganic settable slurries, to a process for the formulation thereof, and to the use of such slurries for sealing and/or consolidating soils and ground formations and/or construction (building) materials via injection technique.

Description of the Prior Art:

The treatment of soils and/or of construction materials via injection technique entails filling or repairing cracks, or ground imperfections, with slurries of various compositional nature intended to modify the characteristics of the ground, building material, etc., thus treated.

These modifications are concerned either with improving the mechanical properties of ground formations in the case of consolidation, or with reducing the permeability in the case of sealing. It is also possible to treat, via injection technique, for purposes of modifying these two properties.

Until recently, sealing and consolidating soils or construction materials was principally carried out by injecting organic slurries therein. However, the syneresis products of such slurries (decomposition of the chemical products injected or formed) cause contamination of ground waters and of surface waters.

Thus, the current major concern in the art of sealing and/or consolidating soils is the preservation of the quality of ground waters and of surface waters, such as water courses and reservoir waters.

This concern has prompted the use of alternate inorganic slurries.

To satisfy, technically and economically, the new constraints presented by ecological considerations, many alternatives have been proposed to this art.

Thus, French Patent No. 2,571,734 describes an injectable aqueous slurry for the consolidation and/or sealing of soils which comprises fine particles of amorphous silica and particles of slaked lime.

However, this slurry presents the disadvantage of requiring an excessively lengthy setting time (approximately 2 days).

Also, French Patent No. 2,528,441 describes a sealing and/or consolidating agent for soils comprising a concentrated sodium solution of specific silica and, optionally, of lime or a calcium salt. The dissolved silica reacts with the calcium to form hydrated calcium silicate crystals.

However, these slurries present the disadvantages either of having mechanical properties which are only marginally satisfactory, or of requiring an excessively short setting time, incompatible with the desired application, or also of being initially too viscous.

SUMMARY OF THE INVENTION

Accordingly, a major object of the present invention is the provision of improved injectable slurries useful, e.g., for the consolidation of unstable ground formations, and which are characterized by controlled times for the setting thereof.

Another object of the present invention is the provision of inorganic slurries presenting, after setting, satisfactory mechanical properties and non-polluting characteristics in the event of sealing and/or consolidating soils or construction materials therewith.

Briefly, the present invention features the formulation of slurries from an alkali metal silicate solution, a calcium-based water-soluble compound, an alkali metal aluminate and an alkali metal hydroxide.

DETAILED DESCRIPTION OF PREFERRED EMBODIMENTS OF THE INVENTION

More particularly according to the present invention, provided hereby are certain injectable inorganic slurries well suited for the consolidation of unstable soil/ground formations and for the repair of construction materials, and which are both simple to use and economical.

Preferably, the alkali metal present in the formulations/process of the present invention is sodium.

According to the invention, it is possible to use, as the calcium-based water-soluble compound, any calcium salt, such as calcium chloride, calcium carbonate, lime, or mixture thereof. Advantageously, the calcium-based water-soluble compound is lime or a lime/calcium carbonate mixture, the calcium carbonate being present as the minor component by weight.

In the event of using the slurry for sealing and/or consolidating soils or construction materials, the particle size of this calcium-based water-soluble compound is selected depending on the size of the cracks which exist in the material or soil to be treated. In actual practice, the calcium-based water-soluble compound is preferably micronized lime, more particularly lime in which the mean particle diameter ranges from 0.5 to 9 $\mu$m, preferably from 1 to 4 $\mu$m.

The alkali metal aluminate component can be either in the dry powder form, or in solution in water, or in sodium solution. Preferably, an alkali metal aluminate is used which comprises from 35% to 45% by weight of $M_2O$ and from 55% to 65% by weight of $Al_2O_3$ (M representing the alkali metal).

Advantageously, the process of the invention employs an alkali metal silicate solution having an $SiO_2/M_2O$ ratio by weight greater than or equal to 1.3, preferably greater than or equal to 2. Hereinafter, this ratio will be designated Ri.

The alkali metal hydroxide constituent of the subject formulations reduces the $SiO_2/M_2O$ ratio by weight of the alkali metal silicate solution; $M_2O$ then represents the amounts of alkali metal present, on the one hand, in the alkali metal solution and, on the other, in the alkali metal hydroxide, each being expressed as $M_2O$. Thus, the amount of alkali metal hydroxide used preferably corresponds to the amount required for the $SiO_2/M_2O$ ratio by weight to attain a value of from 0.9 to 1.3, and more preferably ranging from 1.05 to 1.15. Hereinafter, this ratio will be designated Rf.

The alkali metal silicate solution generally has an approximately 10% to 55% solids content, preferably 30% to 50% of solids.

In a preferred embodiment of the invention, the alkali metal aluminate is added to said alkali metal silicate solution and, simultaneously or after such addition, the alkali metal silicate solution is reacted with the calcium-based water-soluble compound, the alkali metal hydroxide being added after or, preferably, at the same time as the calcium-based water-soluble compound. The delaying effect on the setting of the slurry thus obtained is thereby all the more accentuated.

In practice, the alkali metal aluminate, the calcium-based water-soluble compound and the alkali metal hydroxide are added simultaneously to the alkali metal silicate solution.

It is preferable, however, to incorporate the alkali metal silicate solution and the alkali metal aluminate such that the Al/Si molar ratio ranges from 0.01 to 0.5, preferably from 0.02 to 0.2. The slurry thus obtained sets belatedly, while avoiding an excessively high viscosity, harmful to the application, consolidation and/or sealing of soils, ground formations or construction materials.

It is also preferable to use the calcium-based water-soluble compound and the alkali metal silicate solution such that the Ca/Si molar ratio ranges from 0.25 to 1, preferably from 0.3 to 1.

From a practical standpoint, especially taking account of the viscosity of the slurry, the silica content in the slurry is preferably less than or equal to 30% by weight, and more preferably is less than or equal to 20% by weight.

The minimum silica content is not critical. However, when the process of the invention is used for consolidating soils or construction materials, the final slurry, after it has been injected and has set, must present satisfactory mechanical properties. In this event, the minimum silica content is greater than or equal to 10%, preferably greater than or equal to 12%, by weight.

In another embodiment of the invention, fine silica particles are used, such as, especially, fumed silica, preferably condensed, or precipitated silica. This embodiment is particularly advantageous when it is desired to provide a slurry having a low initial viscosity while presenting, after setting, satisfactory mechanical properties. The amount of fine silica particles to be added can thus vary from 0% to a maximum amount corresponding to a maximum silica content in the slurry indicated above, namely, a silica content less than, preferably, 30%, more preferably 20% (this content then corresponds to the amount of silica present in the alkali metal silicate solution and to that present in the fine silica particles).

In the event that the process described above is used for sealing and/or consolidating soils or construction materials, the components used are either injected separately into the material to be treated, or preferably are mixed beforehand in order to be injected together into the material to be treated. The first embodiment presents the disadvantage of being complicated, while creating uncertainties as to the quality of the treatment (risk of a heterogeneous presence of the constituents in the cracks).

In order to further illustrate the present invention and the advantages thereof, the following specific examples are given, it being understood that same are intended only as illustrative and in nowise limitative.

In said examples to follow, as in the above description, all parts and percentages are given by weight, unless otherwise indicated.

EXAMPLES 1 TO 6

In a beaker, there were mixed:
(a) a sodium silicate aqueous solution with a ratio by weight Ri ($SiO_2/Na_2O$) $=3.35$ and having a solids content of 33 %,
(b) a suspension, in water, comprising:
   (i) sodium aluminate as a powder marketed by Carlo Erba (56% $Al_2O_3$; 37% $Na_2O$),
   (ii) lime as powder marketed by Prolabo (96% $Ca(OH)_2$, 3% $CaCO_3$ and having a mean particle diameter of 38 μm,
   (iii) sodium hydroxide.

The amounts of the above materials were such that an $SiO_2$ content of 15%, a Al/Si molar ratio of 0.12 and a Ca/Si molar ratio of 0.5 were obtained in the slurry.

The amount of sodium hydroxide added was varied, which caused the final ratio by weight Rf ($SiO_2/Na_2O$) to change.

The following Table I reports the results obtained:

TABLE I

| EXAMPLES | 1 | 2 | 3 | 4 | 5 | 6 (comparative) |
|---|---|---|---|---|---|---|
| Q (%) | 3 | 6 | 7 | 10.8 | 12 | 0 |
| Rf | 2.0 | 1.4 | 1.3 | 1.0 | 0.9 | 3.3 |
| Setting time (min) | <1 | 8 | >60 | >>60 | >>60 | instantaneous |

Q represents the amount of sodium hydroxide added, expressed as $Na_2O$.

The setting time corresponds to the time required for the slurry thus obtained to no longer flow along the wall of the beaker when the latter is inverted.

EXAMPLES 7 TO 12

The reaction was carried out in the same manner as in the preceding examples, under the following conditions:
final $SiO_2$ content was 15%;
Rf=1.3;
the Ca/Si molar ratio was 0.5.

The amount of sodium aluminate was varied in the suspension (Al/Si molar ratio varies).

The results obtained are reported in the following Table II:

TABLE II

| Examples | 7 | 8 | 9 | 10 | 11 | 12 (comparative) |
|---|---|---|---|---|---|---|
| Molar ratio Al/Si | 0.015 | 0.030 | 0.060 | 0.120 | 0.250 | 0 |
| Setting time (min) | 10 | 11 | 16 | >60 | >60 | 8 |

EXAMPLES 13 TO 17

The reaction was carried out in the same manner as in the preceding examples, with the following conditions:
final $SiO_2$ content was 15%;
Rf=0.9.

The amounts of sodium aluminate and lime in the suspension were varied (Al/Si and Ca/Si molar ratios vary).

The results obtained are reported in the following Tables III:

TABLE III

| Examples | 13 | 14 | 15 | 16 | 17 |
|---|---|---|---|---|---|
| Al/Si | 0.12 | 0.12 | 0.12 | 0.25 | 0.25 |
| Ca/Si | 0.12 | 0.25 | 0.50 | 0.12 | 0.50 |
| Viscosity after 3 hours (cp) | 125 | <220 | 850 | 95 | >360 |
| Appearance at 20 hours | soft | soft | hard | soft | hard |

The viscosity was measured using a Brookfield ®, LV series, model 1, viscometer at room temperature.

EXAMPLES 18 TO 30

The reaction was carried out in the same manner, as in the preceding examples, under the following conditions:

Ca/Si molar ratio was 0.5;

the Al/Si molar ratio was 0.12;

the lime used was micronized lime marketed by Baithazard et Cotte (94.5% $Ca(OH)_2$, 3.4% $CaCO_3$ and having a mean particle diameter of 2.9 μm).

The $SiO_2$ content was varied, and the final ratio by weight $Rf = SiO_2/Na_2O$.

The results obtained are reported in the following:

TABLE IV

| Examples | $SiO_2$ content (%) | Rf | Viscosity at 1 min (cp) | t (min) at viscosity 100 cp |
|---|---|---|---|---|
| 18 | 15 | 0.9 | 100 | 1 |
| 19 | 12 | 0.9 | 20 | 45 |
| 20 | 10 | 0.9 | 25 | 3 |
| 21 | 15 | 0.97 | 80 | 3 |
| 22 | 12 | 0.97 | 20 | 10 |
| 23 | 16 | 1.07 | — | 5 |
| 24 | 15 | 1.07 | 41 | 20 |
| 25 | 12 | 1.07 | 17 | 8 |
| 26 | 10 | 1.07 | — | 2 |
| 27 | 15 | 1.15 | 40 | 15 |
| 28 | 12 | 1.15 | — | 5 |
| 29 | 10 | 1.15 | >100 | 1 |
| 30 | 15 | 1.23 | 50 | 10 |

EXAMPLES 31 TO 36

Slurries were prepared in the same manner as in the preceding examples (use of micronized chalk identical to that of Examples 18 to 30); they were permitted to age for 2 to 3 minutes and were then introduced into Fontainebleau sand (marketed by Prolabo), in which the diameter of the particles ranged from 150 to 200 μm, this sand simulating the soil to be treated. This mixture was stirred. The sand/slurry proportion by weight was 73/27.

To evaluate the mechanical properties, this mixture was then poured into a test container (4 cm × 4 cm × 16 cm).

The measurements of the compressive strength were carried out on a Ton Industrie press, at room temperature, at 7, 14 and 21 days of aging of the test specimen.

The results obtained are reported in the following Table V:

| Examples | $SiO_2$ content (%) | Rf | Compression (Mpa) 7 Days | 14 Days | 21 Days |
|---|---|---|---|---|---|
| 31 | 10 | 1.15 | <0.3 | <0.6 | 0.6 |
| 32 | 12 | 1.07 | 0.6 | 0.9 | — |
| 33 | 15 | 1.07 | 1.6 | 1.9 | — |
| 34 | 15 | 1.15 | 2.2 | 2.5 | 4.0 |
| 35 | 15 | 1.23 | 1.8 | 2.6 | 2.8 |
| 36 Comparative | 15 | >13 | 1.6 | 1.6 | 1.6 |

Comparative Example 36 corresponds to a sand/organic slurry mixture prepared in a manner analogous to those of Examples 31 to 35, and the difference thus being the slurry which was prepared by mixing a sodium silicate solution with a ratio Ri=3.3 and diesters D 1000 marketed by Rhone-Poulenc and whose $SiO_2$ content was 15%.

A lixiviation test was carried out on the "injected sand" obtained from the test specimen of Example 34, under the following conditions: volume of unreplaced water equals three times the mass of the sample, duration one month.

The lixivium had a pH in the region of 12 and respective silica and alumina levels of less than 3,000 ppm and 100 ppm. The absence of Ca++ ions in the lixivium was also observed.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An inorganic settable slurry, in aqueous medium, comprising (a) an aqueous solution of an alkali metal silicate, (b) a water-soluble calcium compound, (c) an alkali metal aluminate, and (d) an alkali metal hydroxide, the alkali metal silicate and alkali metal aluminate being present in amounts providing an Al/Si molar ratio ranging from 0.01 to 0.5.

2. The inorganic settable slurry as defined by claim 1, wherein the alkali metal is sodium.

3. The inorganic settable slurry as defined by claim 1, said water-soluble calcium compound is selected from the group consisting of calcium salt, lime, and admixture thereof.

4. The inorganic settable slurry as defined by claim 3, wherein said water-soluble calcium compound is lime or calcium carbonate.

5. The inorganic settable slurry as defined by claim 4, said lime having a mean particle diameter ranging from 0.5 to 9 μm.

6. The inorganic settable slurry as defined by claim 5, said lime having a mean particle diameter ranging from 1 to 4 μm.

7. The inorganic settable slurry as defined by claim 1, said alkali metal aluminate comprising from to 45% by weight of $M_2O$, wherein M is said alkali metal, and from 55% to 65% by weight of $Al_2O_3$.

8. The inorganic settable slurry as defined by claim 1, said aqueous solution of alkali metal silicate having an $SiO_2/M_2O$ ratio by weight of at least 1.3, wherein M is said alkali metal.

9. The inorganic settable slurry as defined by claim 8, said ratio by weight being at least 2.

10. The inorganic settable slurry as defined by claim 1, comprising an amount of alkali metal hydroxide such as to provide an $SiO_2/M_2O$ ratio by weight ranging from 0.9 to 1.3, wherein M is said alkali metal.

11. The inorganic settable slurry as defined by claim 10, comprising an amount of alkali metal hydroxide such as to provide an $SiO_2/M_2O$ ratio by weight ranging from 1.05 to 1.15.

12. The inorganic settable slurry as defined by claim 1, said aqueous solution of an alkali metal silicate having a solids content ranging from 10% to 55%.

13. The inorganic settable slurry as defined by claim 12, said solids content ranging from 30% to 50%.

14. The inorganic settable slurry as defined by claim 1, said Al/Si molar ratio ranging from 0.02 to 0.2.

15. The inorganic settable slurry as defined by claim 1, comprising amounts of water-soluble calcium compound and alkali metal silicate such that the Ca/Si molar ratio ranges from 0.25 to 1.

16. The inorganic settable slurry as defined by claim 15, said Ca/Si molar ratio ranging from 0.3 to 1.

17. The inorganic settable slurry as defined by claim 1, further comprising up to 30% by weight of silica.

18. The inorganic settable slurry as defined by claim 17, comprising up to 20% by weight of silica.

19. The inorganic settable slurry as defined by claim 17, comprising at least 10% by weight of silica.

20. The inorganic settable slurry as defined by claim 19, comprising at least 12% by weight of silica.

21. The inorganic settable slurry as defined by claim 1, further comprising finely divided silica particulates.

22. A soil/ground formation comprising an effective sealing/consolidating amount of the inorganic settable slurry as defined by claim 1.

23. The soil/ground formation as defined by claim 22, wherein said inorganic slurry is in a set state.

24. A building material comprising an amount of the inorganic settable slurry as defined by claim 1 effective to repair cracks in said building material.

25. The building material as defined by claim 24, wherein said inorganic slurry is in a set state.

* * * * *